United States Patent
Takahashi

(10) Patent No.: US 10,240,005 B2
(45) Date of Patent: Mar. 26, 2019

(54) ABA BLOCK COPOLYMER INCLUDING LACTIC ACID UNITS

(71) Applicant: NIPPON SODA CO., LTD., Tokyo (JP)

(72) Inventor: Eiji Takahashi, Ichihara (JP)

(73) Assignee: NIPPON SODA CO., LTD., Tokyo (JP)

(*) Notice: Subject to any disclaimer, the term of this patent is extended or adjusted under 35 U.S.C. 154(b) by 0 days.

(21) Appl. No.: 15/576,419

(22) PCT Filed: Jul. 13, 2016

(86) PCT No.: PCT/JP2016/003310
§ 371 (c)(1),
(2) Date: Nov. 22, 2017

(87) PCT Pub. No.: WO2017/013853
PCT Pub. Date: Jan. 26, 2017

(65) Prior Publication Data
US 2018/0155504 A1 Jun. 7, 2018

(30) Foreign Application Priority Data
Jul. 17, 2015 (JP) ................. 2015-143335

(51) Int. Cl.
*C08G 63/08* (2006.01)
*C08G 63/688* (2006.01)
*C08G 81/00* (2006.01)
*C08L 101/16* (2006.01)

(52) U.S. Cl.
CPC ............. *C08G 81/00* (2013.01); *C08G 63/08* (2013.01); *C08G 63/688* (2013.01); *C08G 63/6882* (2013.01); *C08L 101/16* (2013.01)

(58) Field of Classification Search
CPC .. C08G 63/08; C08G 63/688; C08G 63/6882; C08G 81/00; C08L 101/16
See application file for complete search history.

(56) References Cited

U.S. PATENT DOCUMENTS

2011/0270387 A1* 11/2011 Wang ................ A61L 31/06
623/1.46

FOREIGN PATENT DOCUMENTS

| JP | H09-40761 A | 2/1997 |
|---|---|---|
| JP | H11-269097 A | 10/1999 |
| JP | 2007-321141 A | 12/2007 |
| JP | 2010-111814 A | 5/2010 |
| JP | 2010-540003 A | 12/2010 |
| WO | 2009/081280 A2 | 7/2009 |

OTHER PUBLICATIONS

Yongzhen, L. et al. Journal of Applied Polymer Science vol. 118 pages 2005-2008 (Jun. 2010).*
Ye, W.P. et al. Reactive & Functional Polymers vol. 32 pp. 161-168 (Feb. 1997).*
Ryner, M_. and Albertsson, A.-C., "Resorbable and Highly Elastic Block Copolymers from 1,5-Dioxepan-2-one ano L-Lactide with Controlled Tensile Properties and Hydrophilicity", Biomacromolecules, vol. 3, pp. 601-608, 2002.
Leemhuis, M. et al., "Functionalized Poly(a-hydroxy acid)s via Ring-Opening Polymerization: Toward Hydrophilic Polyesters with Pendant Hydroxyl Groups", Macromolecules, vol. 39, pp. 3500-3508, 2006.
Braun, C.H. et al., "Synthesis and Thin film Phase Behaviour of Functional Rod-Coil Block Copolymers Based on Poly(para-phenylenevinylene) and Poly(lactic acid)", Macromol. Rapid Commun. vol. 32, pp. 813-819, 2011.
Aug. 16, 2016 International Preliminary Report on Patentability issued in International Patent Application No. PCT/JP2016/003310.
Aug. 16, 2016 International Search Report issued in International Patent Application No. PCT/JP2016/003310.

* cited by examiner

*Primary Examiner* — Irina S Zemel
*Assistant Examiner* — Jeffrey S Lenihan
(74) *Attorney, Agent, or Firm* — Oliff PLC

(57) ABSTRACT

Disclosed herein is an ABA type block copolymer including a repeating unit derived from lactic acid that is excellent in physical properties, such as toughness. The ABA type block copolymer includes a polymer block A including a repeating unit derived from lactic acid and a polymer block B including a repeating unit represented by a formula [I] linked in an order of A-B-A. In the following formula [I], $R^1$ represents a hydrogen atom, an unsubstituted or substituted alkyl group, or an unsubstituted or substituted aryl group, $R^2$ and $R^3$ each independently represent a hydrogen atom, an unsubstituted or substituted alkyl group, or an unsubstituted or substituted aryl group, and n represents an integer of 1 to 10. X represents —S—, —SO— or —$SO_2$—, and $R^4$ represents an unsubstituted or substituted alkyl group, or an unsubstituted or substituted aryl group.

[I]

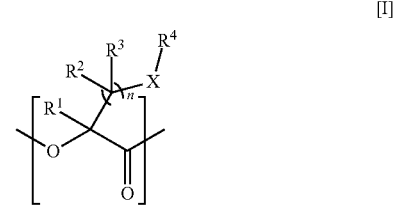

1 Claim, No Drawings

ABA BLOCK COPOLYMER INCLUDING LACTIC ACID UNITS

TECHNICAL FIELD

The present invention relates to an ABA type block copolymer comprising a lactic acid unit.

The present application claims priority to Japanese Patent Application No. 2015-143335 filed on Jul. 17, 2015, the content of which is incorporated herein.

BACKGROUND ART

In recent years, from the viewpoint of environmental protection, efforts to aim at carbon neutrality have proceeded. Among these efforts, in the chemical industry, attention is focused on biopolymers made from biomass resources. Among biopolymers, polylactic acid is made from an agricultural product, and therefore is excellent in terms of cost and the like, and is put to practical use in various applications. But, a disadvantage of the polylactic acid is that its molecular structure is rigid, and therefore its molded article is hard and brittle.

In order to solve such a disadvantage, attempts are made to convert polylactic acid into various block polymers.

For example, in Patent Document 1, a polylactic acid block copolymer obtained by linking a crystalline segment consisting of a substantial homopolymer of poly-L-lactic acid or poly-D-lactic acid and an amorphous segment comprising L-lactic acid and D-lactic acid as main components is proposed.

In Patent Document 2, a block copolymer in which a polylactic acid segment and a vinyl-based polymer segment are linked at a copolymerization ratio of 99/1 to 1/99 parts by weight is proposed.

In Patent Document 3, a polylactic acid-based block copolymer having segments consisting of L-lactic acid units at both ends of a segment mainly comprising an aliphatic carbonate unit via segments consisting of D-lactic acid units is proposed.

PRIOR ART DOCUMENTS

Patent Documents

Patent Document 1: Japanese unexamined Patent Application Publication No. 9-40761
Patent Document 2: Japanese unexamined Patent Application Publication No. 2007-321141
Patent Document 3: Japanese unexamined Patent Application Publication No. 2010-111814

SUMMARY OF THE INVENTION

Object to be Solved by the Invention

It is an object of the present invention to provide a copolymer comprising a repeating unit derived from lactic acid that is excellent in physical properties such as toughness.

Means to Solve the Object

As a result of repeated studies for achieving the above object, the present invention encompassing the following aspects has been completed.

(1) An ABA type block copolymer, in which a polymer block A comprising a repeating unit derived from lactic acid and a polymer block B comprising a repeating unit represented by a formula [I] are linked in an order of A-B-A,

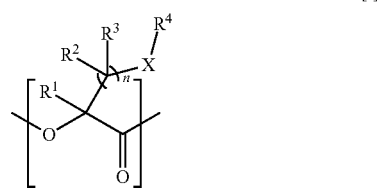

[I]

(wherein $R^1$ represents a hydrogen atom, an unsubstituted or substituted alkyl group or an unsubstituted or substituted aryl group, $R^2$ and $R^3$ each independently represent a hydrogen atom, an unsubstituted or substituted alkyl group or an unsubstituted or substituted aryl group, and n represents any integer of 1 to 10; and X represents —S—, —SO— or —SO$_2$—, and $R^4$ represents an unsubstituted or substituted alkyl group or an unsubstituted or substituted aryl group.)

Effect of the Invention

The ABA type block copolymer comprising a lactic acid unit according to the present invention is excellent in physical properties such as toughness.

MODE OF CARRYING OUT THE INVENTION (Polymer Block A)

A polymer block A is a polymer block comprising a repeating unit derived from lactic acid. The repeating unit derived from lactic acid is a repeating unit represented by the following formula [II]. In the formula [II], the carbon atom represented by * is an asymmetric carbon atom. The repeating units represented by the formula [II] comprised in the polymer block A may be consisted of any one of the following: only R forms, only S forms, a mixture of R forms and S forms, or a racemic body, and are preferably consisted of only either of R forms or S forms.

[II]

The polymer block A encompasses a homopolymer consisting of only the repeating unit [II] derived from lactic acid and a copolymer of the repeating unit [II] derived from lactic acid and a repeating unit derived from a monomer copolymerizable with the repeating unit [II] derived from lactic acid.

As the monomer copolymerizable with the repeating unit [II] derived from lactic acid, glycolic acid or a dimer thereof, a hydroxyalkanoic acid, ε-caprolactone or the like may be exemplified.

As the proportion of the repeating unit [II] derived from lactic acid in the polymer block A, 10 to 100% by weight, 20 to 100% by weight, 30 to 100% by weight, 40 to 100% by weight, 50 to 100% by weight, 60 to 100% by weight, 70 to 100% by weight, 80 to 100% by weight, 90 to 100% by weight or the like may be selected.

(Polymer Block B)

A polymer block B is a polymer block comprising a repeating unit represented by formula [I].

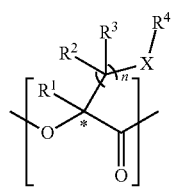

In the formula (I), $R^1$ represents a hydrogen atom, an unsubstituted or substituted alkyl group or an unsubstituted or substituted aryl group. Among them, $R^1$ preferably represents a hydrogen atom.

As the alkyl group for $R^1$, an alkyl group having 1 to 6 carbon atoms such as a methyl group, an ethyl group, a n-propyl group, a n-butyl group, a n-pentyl group, a n-hexyl group, an i-propyl group, an i-butyl group, a s-butyl group, a t-butyl group, an i-pentyl group, a neopentyl group, a 2-methylbutyl group, a 2,2-dimethylpropyl group or an i-hexyl group, or the like may be exemplified.

As the aryl group for $R^1$, an aryl group having 6 to 10 carbon atoms such as a phenyl group or a naphthyl group, or the like may be exemplified.

As the substituent of the "substituted alkyl group", a halogen atom, an alkoxy group, an aryl group or the like may be exemplified.

As the substituent of the "substituted aryl group", a halogen atom, an alkyl group, an alkoxy group or the like may be exemplified.

For the above alkyl group and the alkyl group portion of the alkoxy group, the same groups as those illustrated for the alkyl group of the above $R^1$ may be exemplified. As the aryl group, the same groups as those illustrated for the aryl group of the above $R^1$ may be exemplified.

In the formula [I], $R^2$ and $R^3$ each independently represent a hydrogen atom, an unsubstituted or substituted alkyl group or an unsubstituted or substituted aryl group. Among them, $R^2$ and $R^3$ each preferably represent a hydrogen atom.

As the alkyl group for $R^2$ and $R^3$, an alkyl group having 1 to 6 carbon atoms such as a methyl group, an ethyl group, a n-propyl group, a n-butyl group, a n-pentyl group, a n-hexyl group, an i-propyl group, an i-butyl group, a s-butyl group, a t-butyl group, an i-pentyl group, a neopentyl group, a 2-methylbutyl group, a 2,2-dimethylpropyl group or an i-hexyl group, or the like may be exemplified.

As the aryl group for $R^2$ and $R^3$, an aryl group having 6 to 10 carbon atoms such as a phenyl group or a naphthyl group, or the like may be exemplified.

As the substituents of the "substituted alkyl group" and the "substituted aryl group", the same ones as the substituents for the above $R^1$ may be exemplified.

n represents an integer of any of 1 to 10, and n preferably represents 2.

In the formula [I], X represents —S—, —SO— or —SO$_2$—, and preferably represents —S—.

In the formula [I], $R^4$ represents an unsubstituted or substituted alkyl group or an unsubstituted or substituted aryl group.

As the alkyl group for $R^4$, an alkyl group having 1 to 6 carbon atoms such as a methyl group, an ethyl group, a n-propyl group, a n-butyl group, a n-pentyl group, a n-hexyl group, an i-propyl group, an i-butyl group, a s-butyl group, a t-butyl group, an i-pentyl group, a neopentyl group, a 2-methylbutyl group, a 2,2-dimethylpropyl group or an i-hexyl group, or the like may be exemplified.

As the aryl group for $R^4$, an aryl group having 6 to 10 carbon atoms such as a phenyl group or a naphthyl group, or the like may be exemplified.

As the substituents of the "substituted alkyl group" and the "substituted aryl group", the same ones as the substituents for the above $R^1$ may be exemplified.

In the formula [I], the carbon atom represented by * is an asymmetric carbon atom. The repeating units represented by the formula [I] comprised in the polymer block B may be consisted of any one of the followings: only R forms, only S forms, a mixture of R forms and S forms, or a racemic body, and are preferably consisted of only either R forms or S forms.

The polymer block B encompasses a homopolymer consisting of only the repeating unit [I] and a copolymer of the repeating unit [I] and a repeating unit derived from a monomer copolymerizable with the repeating unit [I].

As the monomer copolymerizable with the repeating unit [I], glycolic acid or a dimer thereof, a hydroxyalkanoic acid, ε-caprolactone or the like may be exemplified.

As the proportion of the repeating unit [I] in the polymer block B, 10 to 100% by weight, 20 to 100% by weight, 30 to 100% by weight, 40 to 100% by weight, 50 to 100% by weight, 60 to 100% by weight, 70 to 100% by weight, 80 to 100% by weight, 90 to 100% by weight or the like may be selected.

(ABA Type Block Copolymer)

The ABA type block copolymer of the present invention is not particularly limited, as long as it is an ABA type block copolymer, in which a polymer block A comprising a repeating unit derived from lactic acid and a polymer block B comprising the repeating unit represented by the formula [I] are linked in the order of A-B-A. The structure of the linking site between the block A and the block B is not particularly limited. The terminal structure of the ABA type block copolymer may be modified with various structures. Specifically, modification may be performed by alkylating or esterifying the hydroxy group at the polymer terminal.

The weight ratio between the polymer block A and the polymer block B in the ABA type block copolymer of the present invention is not particularly limited, but for the total weight of two polymer blocks A/the weight of the polymer block B, the range of 20/80 to 90/10, the range of 30/70 to 80/20 or the like may be selected.

For the weight average molecular weight (Mw) of the ABA type block copolymer of the present invention, 2,000 to 1,000,000, 3,000 to 500,000, 5,000 to 200,000 or the like may be selected. For the molecular weight distribution represented by the weight average molecular weight (Mw)/number average molecular weight (Mn) ratio, 1.0 to 5.0, 1.0 to 4.0, 1.0 to 3.0, 1.0 to 2.0 or the like may be selected. The weight average molecular weight (Mw) and the number average molecular weight (Mn) are values obtained by converting data measured by gel permeation chromatography (GPC) using tetrahydrofuran as a solvent into the molecular weight of standard polystyrene.

(Method for Producing ABA Type Block Copolymer)

A method for producing the ABA type block copolymer in the present invention will be described below, but the production method is not limited to the following production method.

The ABA type block copolymer of the present invention may be produced by polymerizing a cyclic monomer represented by formula [Ia], and a monomer copolymerizable with the cyclic monomer represented by the formula [Ia] according to need, in the presence of a diol compound that is a polymerization initiator, using a polymerization catalyst (a first step, the production of the polymer block B), and then adding lactide, and a monomer copolymerizable with lactide according to need, to the reaction system for polymerization (a second step, the production of the polymer blocks A at both ends of the polymer block B).

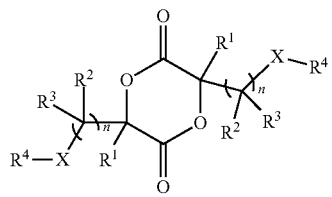

[Ia]

In the formula [Ia], $R^1$, $R^2$, $R^3$, n, X and $R^4$ are the same as $R^1$, $R^2$, $R^3$, n, X and $R^4$ in the formula [I].

The cyclic monomer represented by the formula [Ia] is a known compound described in WO2013/119959A1.

As the monomer copolymerizable with the cyclic monomer represented by the formula [Ia], glycolic acid or a dimer thereof, a hydroxyalkanoic acid, ε-caprolactone or the like may be exemplified.

As the dial compound that is a polymerization initiator, ethylene glycol, diethylene glycol, triethylene glycol, propylene glycol, dipropylene glycol, tripropylene glycol, 1,3-butanediol, 1,4-butanediol, 1,5-pentanediol, neopentyl glycol, 1,6-hexanediol, 3-methyl-1,5-pentanediol, 1,8-octanediol, 1,9-nonanediol, 2-methyl-1,8-octanediol, 2,4-diethyl-1,5-pentanediol or the like may be exemplified.

The used amount of the polymerization initiator is preferably 0.001 to 10 mol % with respect to the total amount of the monomers used in the first step and the second step.

As the polymerization catalyst, for example, a metal such as tin, zinc, titanium, bismuth, zirconium, germanium, antimony or aluminum, or a derivative thereof is exemplified. Specifically, for example, tin chloride, tin octylate, zinc chloride, zinc acetate, lead oxide, lead carbonate, titanium chloride, an alkoxytitanium, germanium oxide, zirconium oxide or the like may be exemplified, and among them, tin octylate may be preferably used. After the first step, the second step may be continuously performed without adding a new polymerization catalyst.

The above first step and second step may be performed in the presence or absence of an organic solvent.

The organic solvent may be inert to the reaction and capable of dissolving the monomers, and, for example, toluene, xylene, cyclohexane or the like is exemplified.

The reaction temperature is not particularly limited, but is preferably 50 to 170° C., and more preferably 80° C. to 150° C.

The reaction time is preferably 0.5 to 72 hours, and more preferably 2 to 48 hours, for each of the first step and the second step.

After the first step, the reaction may be performed in a one-pot manner by adding lactide to be polymerized in the second step, and a monomer copolymerizable with lactide according to need, to the reaction system in which the first step has been performed, without isolating the product. In the second step, the polymer blocks A are produced at both ends of the polymer block B obtained in the first step.

As the monomer copolymerizable with lactide, glycolic acid or a dimer thereof, a hydroxyalkanoic acid, ε-caprolactone or the like may be exemplified.

After the second step, the obtained ABA type block polymer may be purified by a known purification method.

(Application of ABA Type Block Copolymer)

The ABA type block copolymer of the present invention may be used in an application such as an interior material of an automobile; the enclosure of a home electric appliance; a container; a packaging material; a building material; a compost bag; a tape; a band; stationery; a fiber; a gardening supply; a sandbag; a card; a dish; a medical material such as a suture, a vascular stent, a biological cell carrier or a drug carrier; a ship bottom paint; an antimicrobial agent; a sustained-release preparation; or a dispersing agent.

EXAMPLE

Next, the present invention will be explained more specifically below referring to Example, but the present invention is not intended to be limited to the following Example.
Example Production of ABA Type Block Polymer
3,6-Bis(2-(methylthio)ethyl-1,4-dioxane-2,5-dione (40.21 g, 152 mmol) and diethylene glycol (0.0732 g, 0.7 mmol) and tin octylate (0.235 g, 0.6 mmol) were added to a 500 mL eggplant flask in a nitrogen gas flow bag, and stirred at 130° C. for 3 hours. Then, the mixture was stirred at 140° C. for 6 hours. When part of the mixture was sampled, and subjected to GPC analysis, a polymer having a weight average molecular weight (Mw) of 33200 and a molecular weight distribution (Mw/Mn) of 1.97 had been produced.

Then, lactide (92.55 g, 642 mmol) was added to the reaction system, and the mixture was stirred at 140° C. for 9 hours. Toluene (450 g) and tetrahydrofuran (100 g) were added to the obtained solution, and then the solution was poured into isopropanol (4 L). The precipitated polymer was filtered, and then air-dried under a nitrogen gas flow. Further, the polymer was dried under reduced pressure at 60° C. to obtain an ABA type block polymer 1 (129.80 g). When the obtained ABA type block polymer 1 was analyzed by GPC, the weight average molecular weight (Mw) was 101600, and the molecular weight distribution (Mw/Mn) was 1.87.

<Evaluation of Physical Properties of ABA Type Block Polymer 1>

For the polymer synthesized in Example 1, a sheet of 200 mm×200 mm×about 2.0 mm was made by press molding, and then the test piece was cut using milling machines, to fabricate an evaluation test piece. For comparison, an evaluation test piece was fabricated in the same manner using polylactic acid (TE-2000 manufactured by UNITIKA LTD.).

(Press Molding Conditions)
Press conditions (electrothermal press)
Preheating: 180° C.×5 minutes
Pressurization: 180° C.×1 minute
Cooling: 40° C.×5 minutes (Test Piece Cutting Conditions)

Equipment used: CNC milling machine CPM403 manufactured by COESFELD band saw L300 manufactured by Ueshima Seisakusho Co., Ltd.

Shop-Ace M18A small size milling machine manufactured by KOTOBUKI BOEKI Co. & MECANIX Co., Ltd.

The tensile strength (MPa) of each test piece was measured according to JIS K 7161-1: 2014. The Izod impact strength (kj/m$^2$) was measured according to JIS K 7110: 1999. The Vicat softening temperature (° C.) was measured according to JIS K 7206: 1999. The results are shown in Table 1.

TABLE 1

| | ABA type block polymer 1 | Polylactic acid TE-2000 |
|---|---|---|
| Tensile strength (MPa) | 29.7 | 58.5 |
| Izod impact strength (kj/m$^2$) | 38 | 2.6 |
| Vicat softening temperature (° C.) | 58 | 62 |

As shown in Table 1, the tensile strength of the ABA type block polymer 1 was about ½ of the polylactic acid (TE-2000). The Izod impact strength of the ABA type block polymer 1 showed about 15 times the value of the polylactic acid (TE-2000). From this, the ABA type block polymer 1 has a higher toughness as compared to the polylactic acid (TE-2000). In addition, the Vicat softening temperature of the ABA type block polymer 1 was equal to that of the polylactic acid (TE-2000).

The invention claimed is:

1. An ABA type block copolymer, in which a polymer block A comprising a repeating unit derived from lactic acid and a polymer block B comprising a repeating unit represented by a formula [I] are linked in an order of A-B-A,

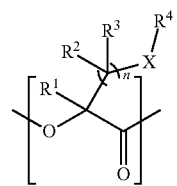

[I]

(wherein $R^1$ represents a hydrogen atom, an unsubstituted or substituted alkyl group, or an unsubstituted or substituted aryl group, $R^2$ and $R^3$ each independently represent a hydrogen atom, an unsubstituted or substituted alkyl group, or an unsubstituted or substituted aryl group, and n represents an integer of any of 1 to 10; and X represents —S—, —SO— or —SO$_2$—, and $R^4$ represents an unsubstituted or substituted alkyl group, or an unsubstituted or substituted aryl group).

* * * * *